(12) United States Patent
Curiel

(10) Patent No.: US 6,715,797 B2
(45) Date of Patent: Apr. 6, 2004

(54) METHODS OF CREATING A TAMPER RESISTANT INFORMATIONAL ARTICLE

(76) Inventor: Yoram Curiel, 2697 International Pkwy., Suite 100, Parkway 2, Virginia Beach, VA (US) 23452

( * ) Notice: Subject to any disclaimer, the term of this patent is extended or adjusted under 35 U.S.C. 154(b) by 9 days.

(21) Appl. No.: 10/287,360

(22) Filed: Nov. 4, 2002

(65) Prior Publication Data

US 2003/0062716 A1 Apr. 3, 2003

Related U.S. Application Data

(60) Division of application No. 09/859,940, filed on May 17, 2001, which is a continuation-in-part of application No. 09/723,178, filed on Nov. 27, 2000, which is a continuation-in-part of application No. 09/019,509, filed on Feb. 5, 1998, now Pat. No. 6,164,548.

(51) Int. Cl.$^7$ .............................................. B42D 15/00
(52) U.S. Cl. .............................. 283/67; 283/70; 283/86; 283/109; 283/111; 283/904; 428/916; 235/488; 235/457
(58) Field of Search ................................. 283/67, 70, 86, 283/107, 109, 111, 904; 428/913, 914, 915, 916; 235/487, 488, 457; 156/278, 279

(56) References Cited

U.S. PATENT DOCUMENTS

| | | | |
|---|---|---|---|
| 3,582,439 | A | 6/1971 | Thomas |
| 4,378,392 | A | 3/1983 | Segel |
| 4,429,015 | A | 1/1984 | Sheptak |
| 4,631,222 | A | 12/1986 | Sander |
| 4,684,795 | A | 8/1987 | Colgate, Jr. |
| 4,856,857 | A | 8/1989 | Takeuchi et al. |
| 4,897,533 | A | 1/1990 | Lyszczarz |
| 4,971,646 | A | 11/1990 | Schell et al. |
| 5,003,915 | A | 4/1991 | D'Amato et al. |
| 5,044,707 | A | 9/1991 | Mallik |
| 5,071,597 | A | 12/1991 | D'Amato et al. |
| 5,083,850 | A | 1/1992 | Mallik et al. |
| 5,085,514 | A | 2/1992 | Mallik et al. |
| 5,116,548 | A | 5/1992 | Mallik et al. |
| 5,128,779 | A | 7/1992 | Mallik |
| 5,142,383 | A | 8/1992 | Mallik |
| 5,145,212 | A | 9/1992 | Mallik |
| 5,243,641 | A | 9/1993 | Evans et al. |
| 5,248,544 | A | 9/1993 | Kaule |
| 5,370,763 | A | 12/1994 | Curiel |

(List continued on next page.)

FOREIGN PATENT DOCUMENTS

| | | | | |
|---|---|---|---|---|
| JP | 404286680 A | | 10/1992 | |
| JP | 11202133 A | * | 7/1999 | ............ G02B/5/32 |
| JP | 02001154209a | * | 6/2001 | ................... 283/86 |

*Primary Examiner*—Willmon Fridie, Jr.
(74) *Attorney, Agent, or Firm*—Arnold B. Silverman; Eckert Seamans Cherin & Mellott, LLC

(57) ABSTRACT

Methods of creating tamper resistant informational articles and related products are disclosed. In one embodiment, a lens has a preformed transparent hologram, metallized portions are provided and may be altered through selective application of heat to predetermined parts thereof to create information which may be fixed or variable. Printing may be provided on the hologram before metallizing. A base portion underlies the metallized layer. In yet another embodiment of the invention, an opaque base portion has a hologram formed in the upper surface thereof with portions of the hologram being made readily visible by partial metallization covering only portions of the hologram with or without information provided as by printing overlying or underlying portions of the metallized sector or both. A transparent overlying lens is secured in overlying relationship. Metallizing may be such as to permit viewing underlying hologram portions or information or not. A corresponding method is provided.

13 Claims, 12 Drawing Sheets

U.S. PATENT DOCUMENTS

| | | |
|---|---|---|
| 5,411,296 A | 5/1995 | Mallik |
| 5,595,624 A | 1/1997 | Curiel |
| 5,838,466 A | 11/1998 | Mallik |
| 5,947,618 A | 9/1999 | Keller et al. |
| 5,948,552 A | 9/1999 | Antoniadis et al. |
| 5,948,555 A | 9/1999 | Curiel |
| 6,025,017 A | 2/2000 | Roth |
| 6,109,801 A | 8/2000 | Mabit |
| 6,164,548 A * | 12/2000 | Curiel ........................ 235/487 |
| 6,366,369 B2 * | 4/2002 | Ichikawa et al. .............. 359/12 |

* cited by examiner

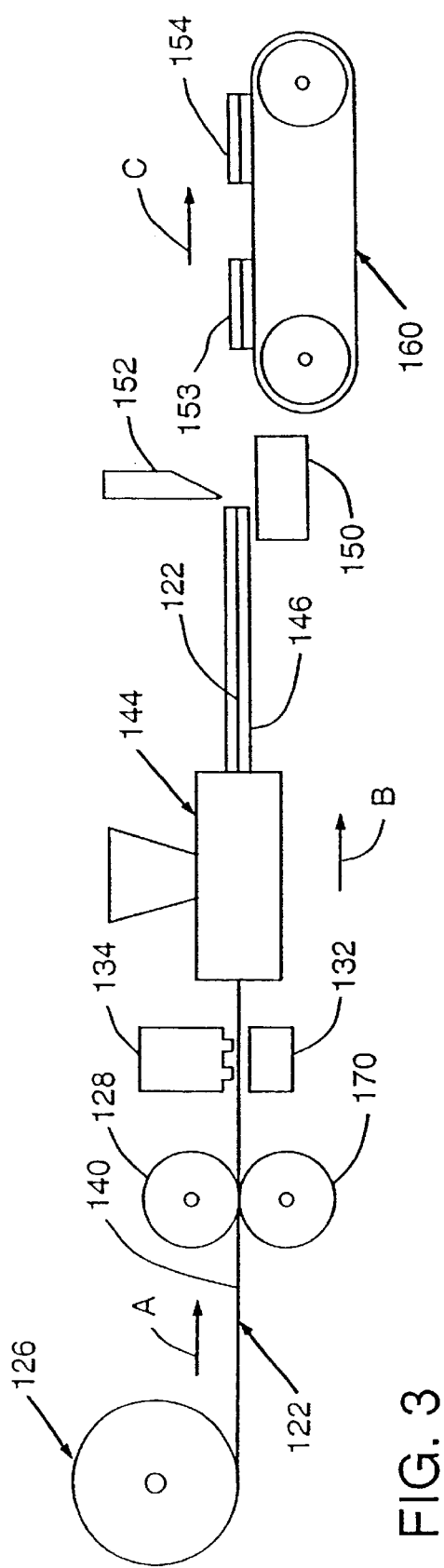
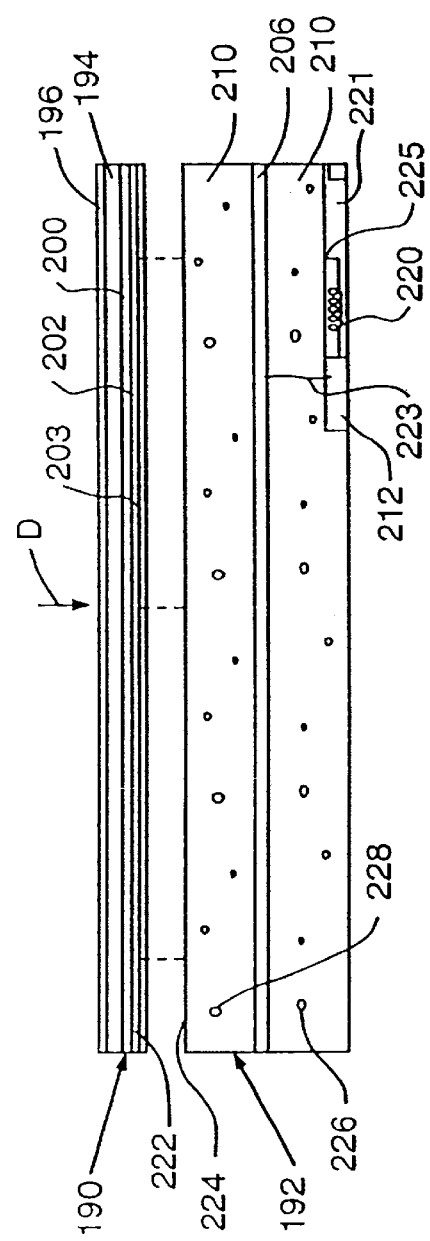
FIG. 3
FIG. 4

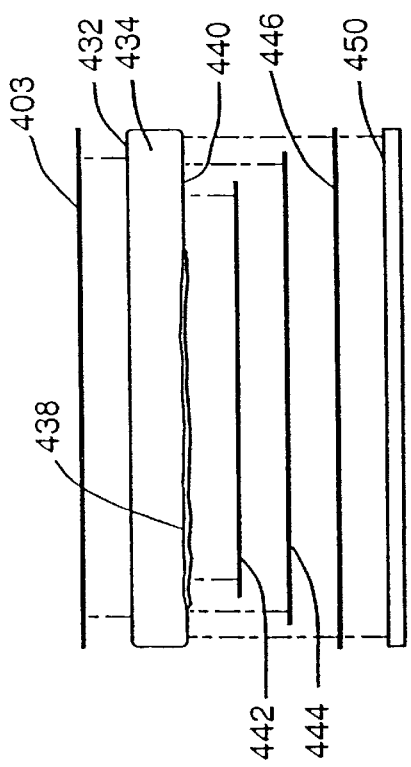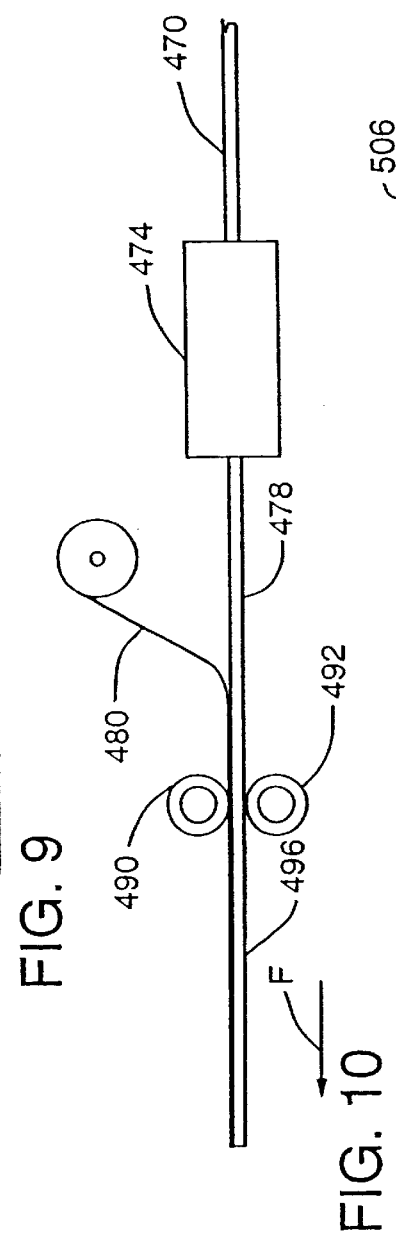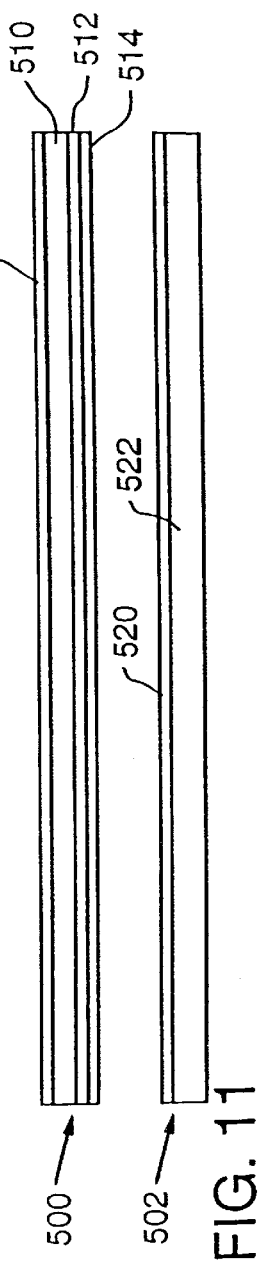

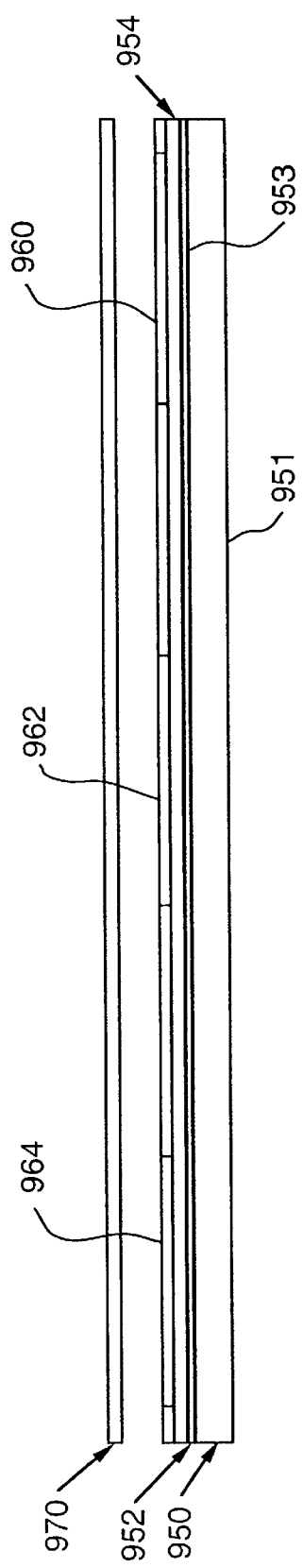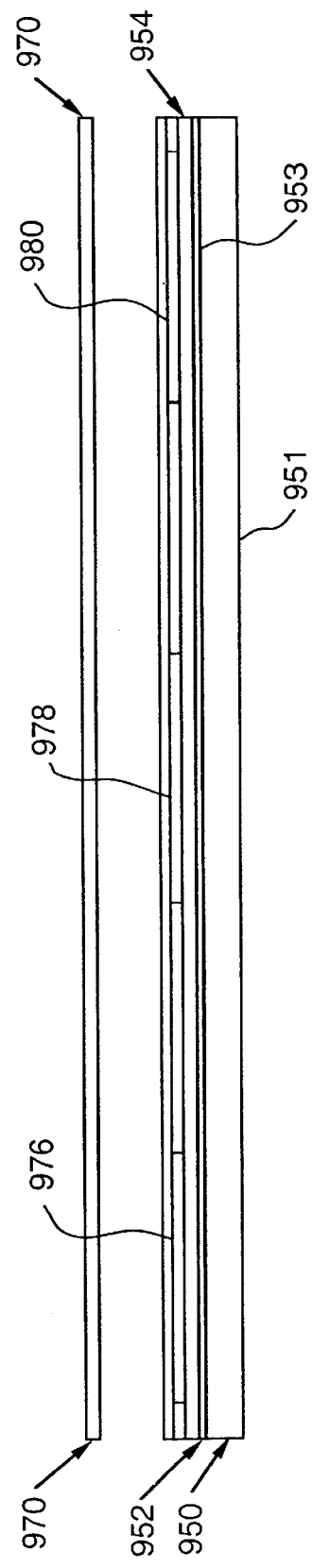

METHODS OF CREATING A TAMPER RESISTANT INFORMATIONAL ARTICLE

CROSS REFERENCE TO RELATED APPLICATION

The present application is a divisional application of U.S. Ser. No. 09/859,940, filed May 17, 2001, which is a continuation-in-part of U.S. Ser. No. 09/723,178, filed Nov. 27, 2000, which was a continuation-in-part of U.S. Ser. No. 09/019,509 filed Feb. 5, 1998 now U.S. Pat. No. 6,164,548.

BACKGROUND OF THE INVENTION

1. Field of the Invention

The present invention relates to a method for creating tamper resistant informational articles and the resultant product and includes various embodiments of holograms formed within a metal layer or within a resinous plastic layer with the information to be protected being placed on or adjacent to the hologram as by printing, for example, and additional material protectively overlying the same.

2. Description of the Prior Art

It has been known for many purposes to provide means to protect informational articles from counterfeiting and alteration. For example, with respect to paper currency, it has been known to use special inks, graphic designs, codes and materials to make it more difficult for counterfeiters to copy the currency. It has also been known to protect cards, such as credit cards, identification cards, debit cards, membership cards and other cards from deterioration, reproduction and alteration by encasing them between a pair of laminated plastic sheets, at least one of which is transparent. See generally, U.S. Pat. No. 3,582,439. Such systems may encapsulate the information to be protected between multiple sheets of resinous plastic, such as PVC, for example, joined using heat.

It has also been known to employ holograms in credit cards and the like so as to inhibit unauthorized reproduction of the same.

U.S. Pat. No. 4,631,222 discloses a hot embossing foil which includes a magnetic layer and a layer which has a structure producing a diffraction effects such as a hologram. Adhesive means may be employed to secure the element to a substrate. The backing foil is adapted to be released from a transfer layer. See U.S. Pat. No. 3,582,439.

U.S. Pat. No. 4,378,392 discloses a laminate which is said to extend the life of a photograph. A plurality of films are adhesively bonded in a protective relationship with respect to a photograph.

U.S. Pat. No. 4,897,533 discloses providing credit cards with magnetic tapes with the card being provided with a transparent film which may take the form of an ultraviolet curable varnish.

U.S. Pat. No. 5,248,544 discloses the use of holograms on paper articles.

U.S. Pat. No. 4,684,795 discloses the use of a security tape which contains an embossed holographic image on a clear polyester carrier which is then coated with ferrous oxide to form a magnetic strip with an optically viewable holographic image thereon.

U.S. Pat. No. 4,856,857 discloses the use of a transparent hologram which may be provided with an overlying removable support layer and an underlying adhesive for securement of the hologram to an article.

U.S. Pat. No. 4,971,646 discloses a holographic film product wherein a film or plastic adhesive is employed to secure a hologram film and metallized coating which underlies a printed layer and a protective layer of clear film.

U.S. Pat. No. 4,429,015 discloses a laminated identification card wherein efforts to delaminate the card result in fibers of uniaxially oriented polyethylene or polypropylene layers being torn to thereby provide a visual indication of tampering.

My U.S. Pat. No. 5,243,641 discloses protecting from undesired alteration articles having information added after creation of a form. This is accomplished by providing a zone of distinct appearance, such as a hologram, placing the added information thereover, and covering the added information and at least a portion of the distinctive zone with a write resistant material. In this manner, accurate photocopying of the document, so as to permit alteration, is resisted as is writing over the inserted information.

My U.S. Pat. Nos. 5,370,763 and 5,595,624 discloses methods of making tamper evident and counterfeit resisting informational articles. A hologram is applied to the article, the information is inserted over the hologram and a transparent tape is applied thereover with a write resistant coating, such as silicone resin, being applied thereover. A particular end use disclosed is in connection with creating a temporary vehicle or registration.

My U.S. Pat. No. 5,948,555 discloses a tamper resistant vehicular validation tab of the type frequently inserted into a recess in a vehicular license plate. As a result of differential adhesive properties provided between layers of the article, an effort to separate the same results in destruction of the integrity of the information provided therein. A further embodiment usable in connection with vehicle windows is disclosed in my U.S. patent application, Ser. No. 08/854,717.

U.S. Pat. No. 5,044,707 discloses discontinuous reflective holograms. It has also been known to form holograms in clear plastic film with metallizing enhancing visibility of surface of the relief patterns therein. See generally U.S. Pat. Nos. 5,044,707; 5,071,597; 5,083,850; 5,085,514; 5,116, 548; and 5,142,383.

U.S. Pat. No. 5,128,779 discloses the use of reflective aluminum dots positioned across a surface relief pattern with the spacing being such that the text or graphics on the substrate may be viewed through the hologram. See also U.S. Pat. Nos. 5,145,212 and 5,411,296.

U.S. Pat. No. 5,838,466 discloses a film which resists viewing of the hologram as a result of matching refractory indices resisting such viewing until the film has been separated.

In spite of the foregoing, there remains a very real and substantial need for providing articles which have information which may be standard information employed on all of the articles and, in some instances, additional information which is variable perhaps identifying the user or a corporate identity or the like. This is accomplished in such a manner that the information is readily visible by the naked eye or machine readable while photocopying and access to the same for alteration or counterfeiting are effectively resisted.

SUMMARY OF THE INVENTION

The present invention provides a plurality of embodiments, each of which is adapted to provide the desired information, whether it be variable or standard information, and whether it be readable by the human eye or machine readable and stored on magnetic media. The information is physically encased within protective materials thereby precluding direct access for alteration. It also contains means which resist undesired photocopying.

The methods of the present invention reduce the number of layers and vendor supplied components required and reduce cost through streamlining the method. The methods also provide the option of full manufacture of the article at a central manufacturing facility or providing a partially fabricated article which can be completed in a simple operation at a retail store or other location.

In one method of the invention, a hologram is formed in a metal foil layer after which the desired information is created on the metal foil, at least partially over the hologram, and the information and hologram-containing metal foil are encapsulated within a resinous plastic material. The encapsulation is preferably effected by extrusion of the resinous plastic material over the foil. In the alternative, the foil may also be encapsulated by injection molding. The items may be formed in an elongated continuous strip with individual cards or other unitary articles being separate therefrom.

The method also contemplates creating a base having an upper surface and a lower surface by passing an elongated metal core through an extruder. The extruder encapsulates the metal core with a resinous plastic material, securing a magnetic media storage element to the base. A lens is created by providing an elongated transparent plastic layer and forming a hologram in the lower surface thereof with information to be protected being applied to the hologram as by printing, for example. The upper surface of the base is then secured to the lower surface of the lens. In a preferred embodiment, the securement of the lens and base is effected within a sufficient time after extrusion that the resinous plastic is at an elevated temperature from the extrusion process.

If desired, small glass beads or metallic particles may be inserted into the resinous plastic material to resist undesired photocopying of the information or the card.

In one embodiment of the invention, the metal foil core may serve as a ground which resists undesired loss of information stored on magnetic media within the card. Also, an antenna may be provided within the card so as to effect more efficient transfer of information between the card and an operably associated machine. Further, if the antenna is provided in a proper configuration, such as a coil, it may receive and store electromagnetic energy directed to the card and employs the energy to operate the card's internal system.

A tamper resistant informational article may include a hologram formed in a metal foil core with information on the foil, at least partially overlying the hologram, and a resinous plastic material encapsulating the foil with the resinous plastic being transparent. The card may, for example, take the form of credit cards, smart cards, identification cards or debit cards. The information applied to the cards may be in strongly contrasting color for ready visibility. This article will resist counterfeiting.

In another embodiment of the invention, a transparent lens having an upper surface and a lower surface has a hologram formed in the lower surface thereof and information applied to the lower surface of the hologram. A base has a metal core encapsulated in a resinous plastic material. A magnetic media storage element may be secured to the base with the base being secured to the lower surface of the lens to thereby protectively encase the hologram and the information. The magnetic storage media element may be an elongated magnetic strip or a microchip, for example.

In another embodiment, a hologram may be formed in the surface of a transparent resinous material and with information being printed on the hologram with subsequent metallizing of the printed hologram by a spraying or other means with a metal layer being produced thereover. A second resinous layer may be secured over the metallized-printed hologram.

In another embodiment of the invention, a hologram is formed in the lower surface of a transparent resinous lens and is metallized either completely or selectively, with or without "information" being applied to the hologram prior to metallizing. In the embodiments where substantially complete metallizing of the hologram is provided, portions of the metallized layer may be altered through application of heat in predetermined regions as by thermal printing means. Similarly, even where selective metallizing of portions of the hologram has been provided so that the entire hologram and information are not covered by the metallized layer, portions of the thin metallized coating may be altered to create desired information in the metallized layer and the adjacent contacting resinous hologram-containing portion. The base, which may be opaque, is then secured thereunder to the lower surface of the lens to resist others getting physical access to the information. A corresponding product is provided.

In yet another embodiment of the invention, an opaque base member has a hologram formed in an upper surface thereof with portions of the hologram covered by metallized sections achieved through partial metallization and an overlying clear lens securing the assembly. Information may be provided overlying or underlying all or portions of the metallized sectors. A corresponding method of creating such structures is disclosed.

It is an object of the present invention to provide methods and associated products for creating an information-containing article wherein the information cannot be directly accessed for alteration and the article resists counterfeiting as by photocopying.

It is a further object of the present invention to provide such a system wherein the informational articles may be made in multiple quantities which are unitary initially and subsequently severed into individual articles.

It is a further object of the present invention to provide such a method and product which is adapted to store information on magnetic storage media and in certain embodiments to have the article provided with a metal strip which serves as a ground and/or a metal strip which serves as an antenna to resist undesired loss of stored information and to enhance efficiency of communication with equipment operatively associated therewith.

It is a further object of the present invention to provide such a system which streamlines the manufacturing process and is economical to employ.

It is another object of the present invention to provide such a system wherein information may contain both (a) standard information employed on all of the articles and (b) variable information which may be keyed to the identity of a particular individual or business entity.

It is a further object of the present invention to provide such a system wherein an article can be partially made at a facility remote from the retail store or other business establishment having limited equipment which completes the manufacture thereof.

It is a further object of the present invention to provide a system which permits customized manufacture of informational articles having the security, durability and functionality desired.

It is a further object of the invention to provide a system for providing an article with secure information capability wherein either fixed information or variable information, or both, may be created by selectively metallizing the layer containing the hologram.

It is another object of the present invention to provide such a metallized hologram information structure which may have the initial manufacture of a lens at a first location followed by customizing at another location with subsequent securement of the lens to an underlying protective base.

It is a further object of the present invention to provide a metallized secure informational article wherein the information is created at least in part through electrically energized, predetermined, thermal modification of the metallized layer.

It is a further object of the present invention to provide such a system wherein a resinous material may have a lower surface provided with a hologram with information provided to the hologram and an underlying metallized layer which may partially or entirely cover the information and hologram being provided and, if desired, subsequent thermal alteration of portions of the metallized layer.

It is yet another object of the present invention to provide an opaque base member with a hologram formed in the upper surface thereof with partial metallizing serving to permit viewing of predetermined portions of the hologram with or without information provided under the partially metallized portions, over the partially metallized portions or both, with a transparent overlying lens securing the assembly.

These and other objects of the invention will be more fully understood from the following description on reference to the illustrations appended hereto.

BRIEF DESCRIPTION OF THE DRAWINGS

FIG. 3 is a partially schematic illustration showing the method of making an informational article of the type shown in FIGS. 1 and 2.

FIG. 4 is a partially exploded view showing a portion of the process of making an informational article of another embodiment of the present invention.

FIG. 9 is a schematic exploded view of a form of informational article of the present invention.

FIG. 10 is a schematic illustration of a method of manufacturing the informational article of the present invention.

FIG. 11 is an exploded view of another embodiment of the invention.

FIG. 17 is an exploded view of a further embodiment of the invention.

FIG. 18 is an exploded view of a further modified embodiment of the embodiment of FIG. 17.

DESCRIPTION OF THE PREFERRED EMBODIMENTS

As employed herein, the term "informational article" refers to an article which is adapted to provide through words, graphics, color codes or other means information which may be provided in a form visually perceived by the human eye or in machine readable form such as information stored on magnetic media, such as a magnetic strip or microchip. The term will expressly include, but not be limited to, identification cards, credit cards, debit cards, smart cards, organization membership cards, security system cards, security entry permits, and other information providing articles wherein it may be desired to resist alteration, tampering or reproduction.

As used herein, the term "hologram" is used in its conventional broad sense and includes the use of a single hologram element alone or multiple hologram elements which may or may not be touching each other or physically in close proximity to each other.

As used herein, the term "encapsulated," when employed, for example, to refer to a metal strip being encapsulated as by extrusion of a resinous plastic material therearound, it will be understood that the end portions of the elongated strip or individual articles severed therefrom, may have the metal edges exposed and, as a result, the term will embrace strips which are completely encapsulated and substantially completely encapsulated, such as where strip ends are exposed. The term "metal strip" will include a strip made of metal, as well as other materials which have been partially or totally covered by a metal layer.

Figure 1:
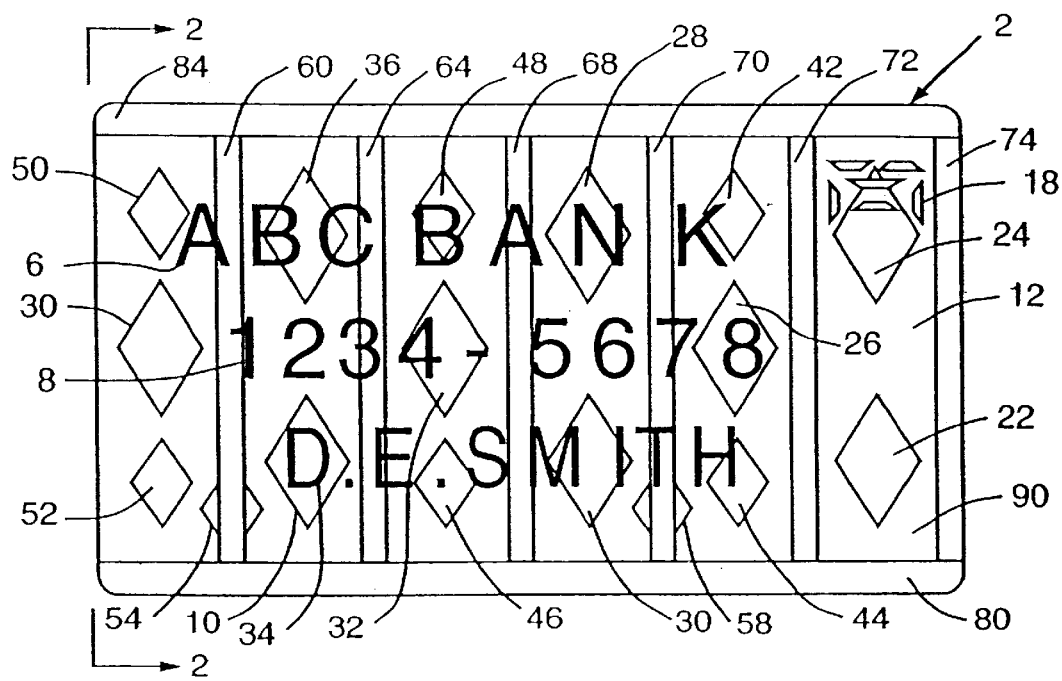
FIG. 1 is a front elevational view of an informational article of the present invention.
Figure 2:
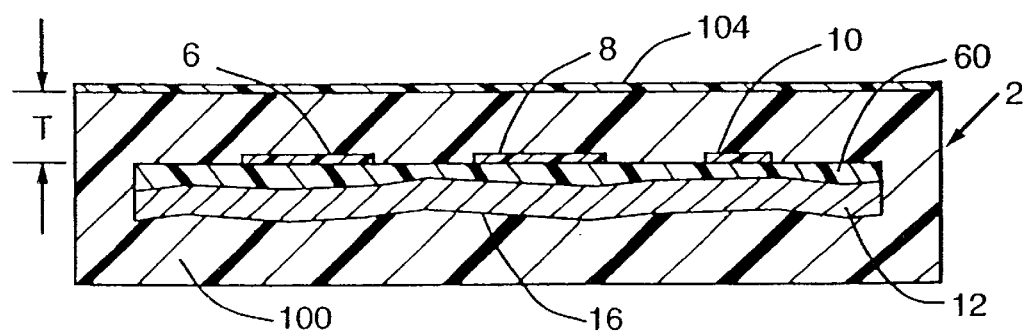
FIG. 2 is a cross-sectional illustration of the informational article of FIG. 1 taken through 2—2.

Referring in greater detail to FIGS. 1 and 2, there is shown a form of informational article 2. The card has a first line of general information 6 which identifies the source of the card as "ABC BANK" and will appear on all cards. This type of information will be regarded for convenience of reference therein as "fixed information," which will appear on every item in the series. Positioned below the fixed information are lines of variable data 8, 10 which is customized to the particular holder of the card. In this example, the card bears number 1234-5678 and the individual is identified as "D. E. SMITH." It is important that the information 6, 8, 10 be protected against (a) alteration by resisting access to the information 6, 8, 10 and (b) photocopying. In this embodiment of the invention a metal foil layer 12 has a hologram indicated generally by the referenced number 60 formed directly in the foil 12 through embossment. This embossed foil 12, therefore, provides both the desired requirement of physical relief and metallizing within the single article. The foil 12 may be aluminum foil or copper foil, for example, and may have a thickness of about 15 to 150 microns. The card 2 may have a total thickness of about 750 microns, for example.

In the specific example of FIGS. 1 and 2, the fixed information will also include the multi-component graphic element 18 which may be of any desired size and shape and may be repeated at two or more locations, if desired. The hologram, in the form shown, consists of a plurality of generally diamond-shaped elements with a first group 22, 24, 26, 28, 30, 32, 34, 36, 38 being of a larger size than the smaller diamonds 42, 44, 46, 48, 50, 52, 54 and 58. In the form shown, the diamonds are positioned across the informational article 2 and are generally grouped into vertical arrays of two or three diamonds. It will be noted that portions of the information 6, 8, 10 overlie the holograms. In this manner, any effort to counterfeit as by photocopying and subsequently alter the photocopy will be resisted, as the hologram will interfere with such copying and alteration.

As a further security measure, portions of the informational article will be of a substantially different color than other portions. Such portions are preferably provided in positions generally overlying the hologram and underlying the information. In the form shown, a plurality of generally vertically oriented, generally parallel lines 60, 64, 68, 70, 72, 74 and a pair of generally parallel end portions 80, 84 have a color which contrasts substantially with the remaining background color indicated generally by the reference number 90 of the remainder of the card. It will be noted that, in the form shown, color band 60 overlies hologram 54 and underlies the letter "A" in the fixed information. Color band 64 underlies a portion of the letter "C", a portion of the number "3" and a portion of letter "E". Color band 68 underlies a portion of the second letter "A" in the fixed information 6 and color band 70 underlies a portion of the number "7" and the letter "T" while overlying hologram segment 58. The number "8" overlies hologram 26. It will be appreciated that various combinations of such features may be employed to provide the desired degree of security.

As shown best in FIG. 2, a resinous plastic material 100 encapsulates the hologram-containing metal foil 12, fixed information 6, and variable information 8, 10, as well as the color bands 60, 64, 68, 70, 72, 74. It is preferred that the thickness "T" of the resinous plastic material portion overlying the foil 12 and hologram, be about 10 to 20 mils. In a preferred embodiment, an overlying anti-abrasive coating 104 may be secured to the resinous plastic material 100 preferably, while the resinous plastic material is at an elevated temperature so as to take advantage of the heat contained therein. The resinous plastic material may, for example, be polyethylene. The resinous plastic material is preferably thermoplastic as any melting of the same will tend to damage or destroy the information 6, 8, 10. The resinous plastic material 100 and the anti-abrasive coating 104, if used, should be transparent so as to permit ready visual observation of the information 6, 8, 10.

FIG. 3 shows a schematic illustration of a method of making the informational article of FIGS. 1 and 2. A coil 126 of metal foil, such as aluminum foil, may be either single width or multiple width, depending upon the informational article being made. There may be not only severance of longitudinal segments to create individual informational articles, but also creating a plurality across the width of the strip requiring additional slitting to separate the individual informational articles. Cooperating rolls 128, 170 serve to emboss the foil 122 as it passes therebetween to create a hologram in the foil. The foil moving in the direction indicated by the arrows A, B, C is then subjected to a printing operation wherein the cooperating printing means 132, 134 causes "information" to be provided on upper surface 140 of the foil 122 overlying the hologram. The foil then enters extruder 144 wherein the foil 122 containing on its upwardly facing surface the hologram and overlying information is encapsulated with a resinous plastic material 146 to create the construction shown generally in FIG. 2. If it is desired to have an overlying anti-abrasion layer 104, this may be applied as either a coating or a film after extrusion, but preferably during the period of time that the resinous plastic material 146 is at an elevated temperature. This will help bond the anti-friction coating 104 to the underlying resinous material 146. If the anti-abrasive material is supplied as a film, a suitable reel (not shown), may serve as the source of the film and a pair of rolls (not shown) applying pressure cause layer 104 to be urged into intimate contact with the upper surface of the resinous plastic material 146. A cutter which may consist of an anvil base 150 and a cutting element 152, which is well known to those skilled in the art, severs the longitudinal product into a plurality of individual informational articles, such as 153, 154, which are transported by endless belt conveyor 160 to the desired cooling, packaging or storage area.

If desired, a bar code (not shown) may be provided in protected position within resinous plastic material 100 overlying hologram, but not interfering with information 6, 8, 10.

It will be appreciated that the embodiment of FIGS. 1 and 2 isolates the information 6, 8, 10 from direct access and alteration. Also, the presence of the hologram, the bands of material of different color and the positioning of the information with respect to both will resist photocopying and alteration of the photocopy in efforts to counterfeit the same. This is accomplished in a streamlined manner with a minimum number of material layers.

Figure 5:
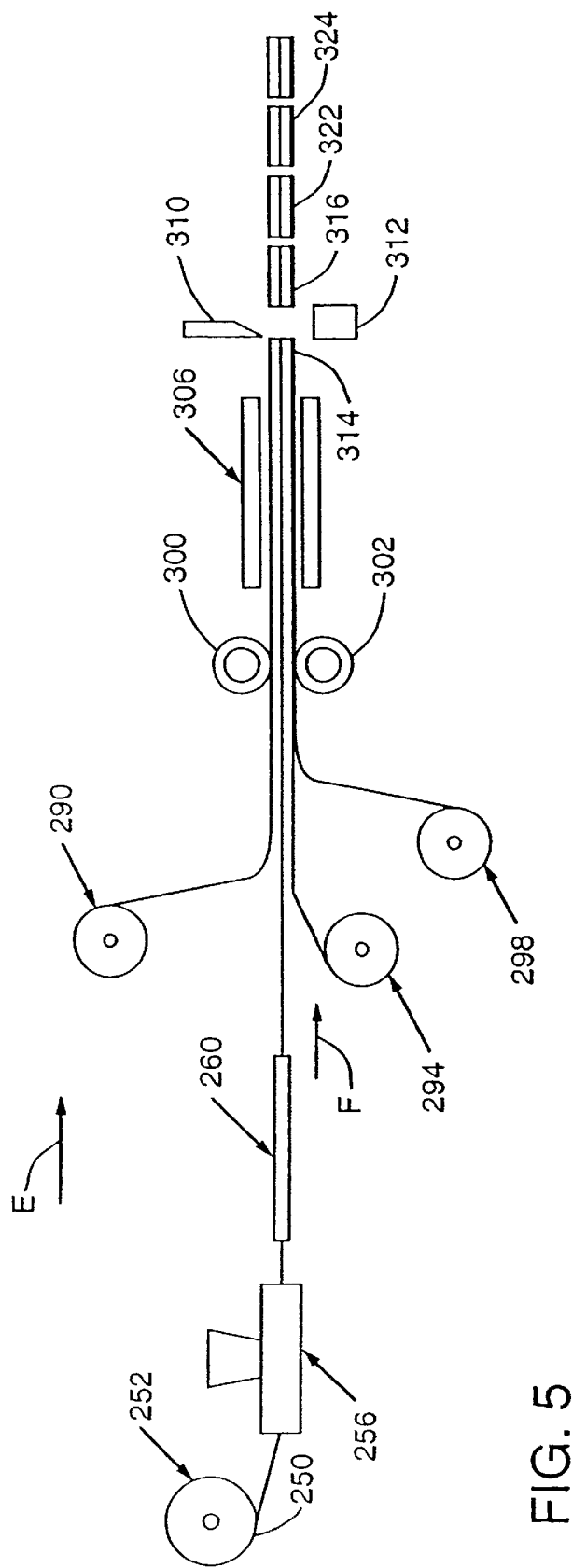
FIG. 5 is a schematic illustration of a method of making the informational article of FIG. 4.
Figure 6:
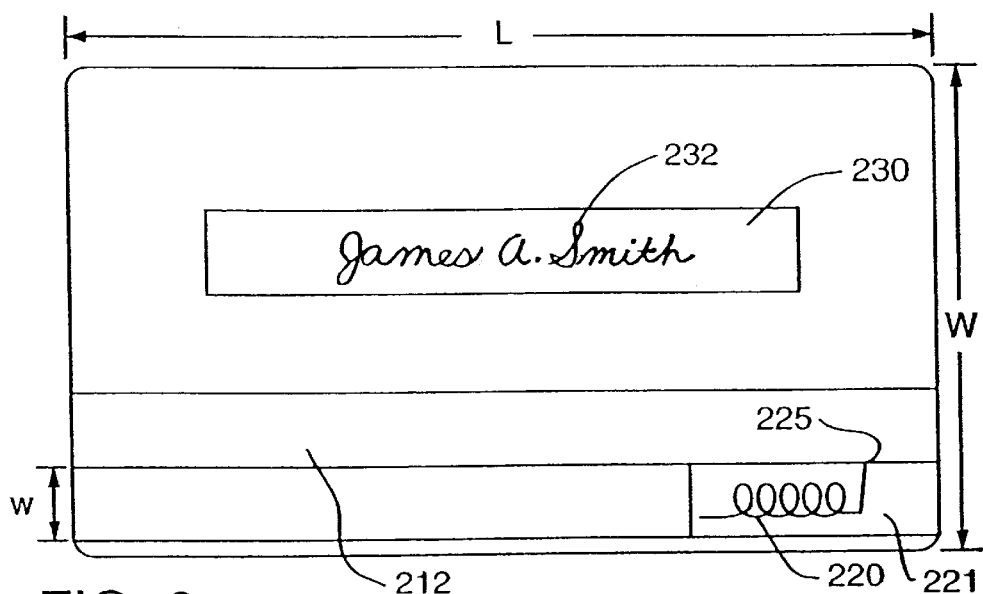
FIG. 6 is a bottom plan view of the informational article of FIG. 4.

Referring to FIGS. 4 through 6, another embodiment of the invention will be considered. In this embodiment of the invention the informational article is created from a lens 190 and a base 192. The lens has a resinous plastic film 194 which may be composed of a polyester or polypropylene, for example, and may have an overlying transparent anti-abrasive coating 196. It is preferred that the film 194 have a thickness of about 10 to 25 percent of the overall card thickness. An embossed hologram 200 is formed in the underside of the lens 190 and information 202 is provided adjacent to the hologram 200 which is subsequently metallized 203 as by coating or foil. The lens 190 will permit viewing from above with the hologram 200 partially overlying the information 202, which may preferably be created by extrusion. Base 192 has a metal core 206 encapsulated within a resinous plastic material 210. In the embodiment shown, a magnetic storage media layer 212, which may take the form of a magnetic strip, has a length which is co-extensive with the length L of the informational article 216 which, in the form shown, is a card having a width W. An antenna member 220, disposed within zone 221, which may also be composed of metal, is positioned in spaced adjacency to the magnetic strip 212 as shown in FIG. 6. As shown in FIGS. 4 and 6, the antenna 220 is connected to the magnetic strip 212 which by lead 223 is connected to ground 206. The magnetic strip 212 may be secured to the informational article 216 by lamination or hot stamping. The antenna 220 may be composed of metal wire or cooled metal foil or may be printed with electrically conductive ink on the article in a predetermined pattern. The antenna 220 can also be created by establishing a metallized zone on the card surface. In the form shown in FIG. 6, antenna 220 has a width w (FIG. 6). In assembling the article shown in FIG. 6, the lower surface 222 of the lens 190, is secured to the upper surface 224 of the base 192, preferably while the extruded material 210 is at an elevated temperature so as to facilitate effective securement, preferably under the influence of applied pressure as by rolls urging the lens 190 and base 192 together. It will be appreciated that in this manner the information 202 is effectively shielded from direct access without at least partial destruction of the assembly and yet, it is readily visible from a position indicated by the arrow D in FIG. 4. It will be appreciated also, that information may be provided by the card 216 through visual means as viewed from arrow D by the naked eyes, as well as through machine reading information contained on the magnetic strip 212 which cooperates with antenna 220 and ground 206.

In order to provide additional resistance to undesired photocopying of the informational article, a plurality of particles, such as 226, 228, are intermixed with the resinous plastic material 210, such that the particles which are preferably rather small, and may be glass beads or hologram fragments. These particles may occupy about ¼ percent to ¾ percent of the total volume of the resinous plastic material 210 or metal foil particles, for example.

Referring again to FIG. 6, it will be noted that a zone 230 of a different colored material which may, for example, be an opaque ink, is provided so that the card holder may put his or her signature 232 over zone 230 as a further security measure.

Referring to FIG. 5, a schematic illustrating a method of making the cards shown in FIGS. 4 and 6 will be considered. In this embodiment, the flow is in the direction indicated by the arrow E. The metal foil 250 which may advantageously be aluminum or copper strip, is fed from reel 252 and enters extruder 256 which serves to encapsulate the metal foil with a resinous plastic material as shown at 260. Subsequently, as the material moves in the direction indicated by arrow F, the previously created lens 290 which has the underlying metallized hologram 200 and information 202 (FIG. 4), as well as the transparent film 194 and anti-abrasive transparent layer 196, is delivered to the upper surface of encapsulated metal foil 260. The magnetic strip 294 is delivered to the undersurface of encapsulated metal foil 260 with the metal antenna 298 which may be composed of aluminum, copper or other electrically conductive material being applied to the assembly. Rolls 300, 302 apply pressure to the encapsulated metal core 260, the magnetic strip 294, the antenna 298 and the lens 290, to urge the assembly into firm self bonding which is contributed to by the extruded resinous plastic material being at an elevated temperature. It will be appreciated that the resinous material is transparent so that the metal layer 250 will serve to render the hologram 200 visible.

The assembly is then moved through cooling zone 306 wherein the temperature is reduced to about 40° F. to 80° F. The cutter means 310, 312, which may be any conventional means, serves to sever the elongated informational article 314 into a plurality of individual informational articles, such as 316, 322, 324, for example. The articles may be individual cards, such as a card selected from the group consisting of debit cards, smart cards, identification cards, organization membership cards, security cards, security entry permits and other information providing articles. In the event that the informational articles emerging from cooling means 306 are of multiple width cutting in the longitudinal direction, will be required to create individual cards.

It will be appreciated that in this embodiment the metal foil 250 serves as a ground to minimize undesired loss of information from the magnetic strip and facilitate efficient communication between the magnetic strip and machines which are capable of communicating with the card by delivering information thereto and receiving information therefrom. Also, the antenna 298 is composed of metal and serves to enhance efficiency of communication between the card and the operatively associated piece of equipment.

Figure 7:
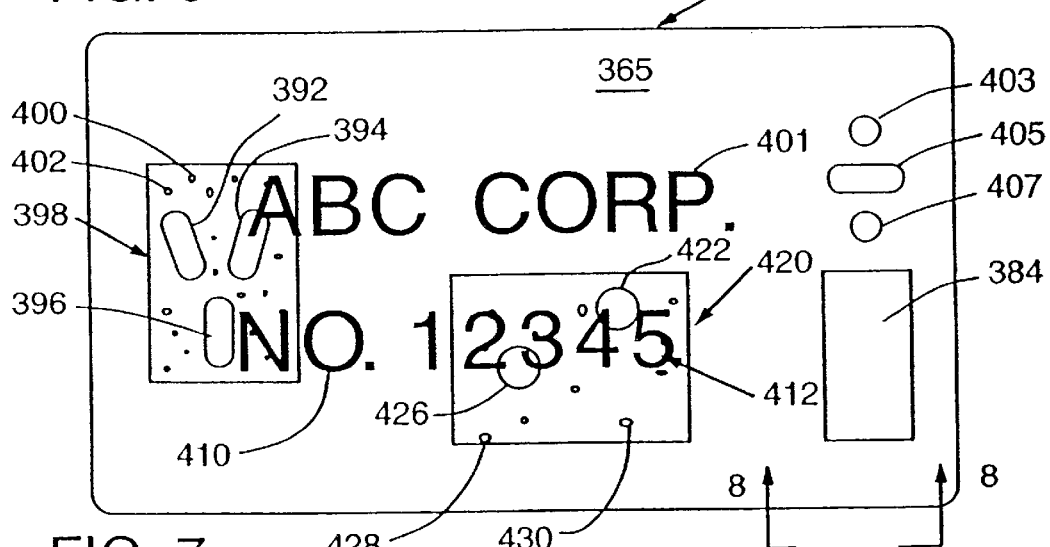
FIG. 7 shows a modified form of informational article of the present invention.
Figure 8:
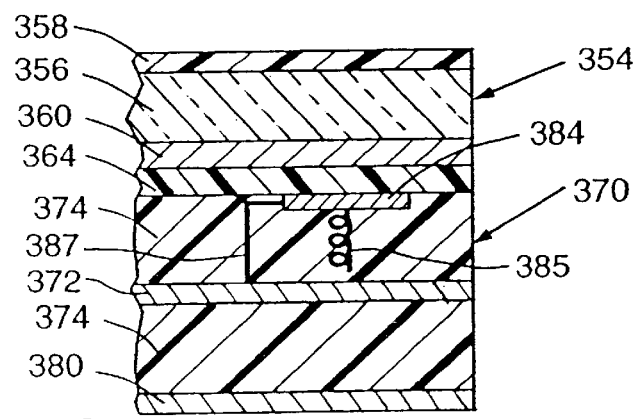
FIG. 8 is a cross-sectional view showing a portion of the informational article of FIG. 7 taken through 8—8.

Referring to FIGS. 7 through 9, a further embodiment of the invention will be considered. The informational article 350 has a transparent lens 354 and an underlying base 370. The lens 354 includes a transparent film 356, an overlying anti-abrasive layer 358, an underlying hologram 360 formed by embossment of the film 356 and the information 364. The underlying base 370 which includes a metal foil core 372, an encapsulating resinous plastic material 374, and an antenna 380. A magnetic storage media takes the form of a microchip 384 which is secured to antenna 385 both of which are received within a recess in the base 370 of the informational article and may contain a storage capacity on the order of number 8K or substantially greater, for example. The microchip is connected to metal core 372 by lead 387. In this embodiment of the invention, the hologram portion that is visible will be contained within the rectangle 390 which, in the form shown, has three elongated hologram elements 392, 394, 396 in a transparent portion of the informational layer 364, thereby permitting the underlying metal layer 372, to enable the hologram to be visualized. In order to enhance the resistance to reproduction by photocopying, a plurality of particles, such as 400, 402, are provided within the resinous plastic material within rectangle 390 so as to resist undesired photocopying. The particles preferably occupy a volume which is about ¼ to ¾ percent of the total volume of the resinous plastic material. As the remaining portion 365 of the informational article 350 is opaque, the hologram will not be visualized as the metal layer 372 underlies the opaque portion 365 which, in the form shown in FIG. 7, is present on all portions of the informational article 350 as viewed in FIG. 7, except sections 390 and 420. The opaque portion 365 serves as an area for receipt of a portion of the information which will be discussed herein provides the visual impression. The opaque portions may be created by any means known to those skilled in the art, such as impregnation in portions of the transparent film 356 or by surface colorings. A preferred approach is to provide a colored film with open or transparent windows overlying the hologram.

It will be noted that the information may be considered to be the elements designated generally by the number 401. The legend "ABC CORP." which may be standard information present on all of the cards and also, a corresponding series of graphic components 403, 405, 407 which are preferably of contrasting color with respect to the base informational portion 365 such that the information is readily visible. The standard information may also include "No. 410." The variable data may consist of the numbers following "No." 410, as identified by the number 412 and, in the form shown, consists of the numbers "12345" which may be employed to identify a particular entity or individual. It is noted that a portion of the first portion 398 of the hologram which, in the form shown, is rectangular has overlying a portion of the standard information 401, 410. The second portion 420 of the hologram in the form of a rectangle contains graphic components 422, 426 and particles, such as 428, 430, with a portion of the numbers "2, 3" and the numbers "4, 5" positioned thereover. As a result, the information 401, 403, 405, 407, 410 and 412 is protectively encased within the assembly. Efforts to gain access to the same will result in at least partial destruction and a visible indication of such efforts. Also, efforts to reproduce the information or reproduce and alter the information, as by photocopying or other counterfeiting means, will be resisted as a result of the holograms and the associated particles.

It will be appreciated that the informational layers may be provided with whatever contrasting colors, graphic components, print fonts or combinations thereof and other features so as to enhance visibility and resist alteration and reproduction.

Referring to FIG. 9, an exploded view of a form of the embodiment shown in FIGS. 7 and 8 will be considered. The assembly has an abrasion resistant coating material 403 which is to be secured to the upper surface 432 of transparent film 434 which contains a hologram 438 embossed in a lower surface 440 thereof. In this embodiment film containing a first print color 442 and certain transparent portions, as well as film 444, which contains a second print color and certain transparent portions, provides the "information" in underlying contacting relationship to the film 434, which film may be made of polyester, for example, and have a thickness of about 0.5 mil to 2 mils. A metal foil layer 446 will serve to visualize those portions of the hologram 438 which have transparent sectors within both films 442 and 444. It will be appreciated that in lieu of employing the preprinted films 442, 444, the information may be printed on the hologram 438. Base portion 450, which is shown only schematically, will be the resinous plastic material having a metal foil core, as hereinbefore described, and suitable magnetic storage media, such as microchip 384, as well as an antenna, if desired. The information article, in lieu of having magnetic storage media, may have other means for communicating information, such as a bar code, which may be read by an appropriate operatively associated piece of equipment.

Referring to FIG. 10, the structures disclosed in FIGS. 7 through 9 may readily be made by the method shown schematically in FIG. 10. A suitable carrier which will function as the core 470 of the base and may be a metal foil, such as aluminum or copper, for example, will enter an extruder 474. The resinous plastic material may, for example, be a polyester, an acrylonitrile butadiene and styrene (ABS) copolymer or a vinyl monomer or polymer (and put in other parts of application). The information film 480, which is primarily the lens, will include the transparent film, an overlying anti-abrasion layer, if provided, an embossed hologram formed in the film, and one or more layers of the information. Rolls 490, 492 under the influence of pressure and preferably the elevated temperature of the resinous plastic material emerging from the extruder, which may have a temperature on the order of 360E F., create the permanent joinder of the lens to the base.

Referring to FIG. 11, a further embodiment of the invention will be considered. This invention contemplates premanufacture of a portion of lens 500 of the assembly. A retail store or other location having more limited equipment than would be required to make the complete assembly of the other embodiments of the invention, after providing information on a preformed article, would complete the informational article.

In the form shown, the lens 500 has a transparent and preferably substantially rigid resinous layer 510 with an overlying anti-abrasive coating 506 and an underlying integrally formed hologram 512. The product shipped to the final fabricator will consist of the transparent assembly 506, 510, 512, which is preferably substantially rigid. This may be stored, if desired, before completion of the article. The end user will provide the information 514 on the hologram and metallizing will subsequently occur in order to permit the hologram to be readily visualized. While the metallizing can take the form of a coating or spray, in the form shown, the base portion 502 has a resinous layer 522 to the top of which is secured a metallic foil layer 520. The base 502 can be secured to the lens 500 by any desirable means such as self-bonding or adhesive. It will be appreciated that in this manner the durability, information protecting assembly and ready visibility of the information is provided by resisting undesired counterfeiting or altering of the information 514.

Figure 12:
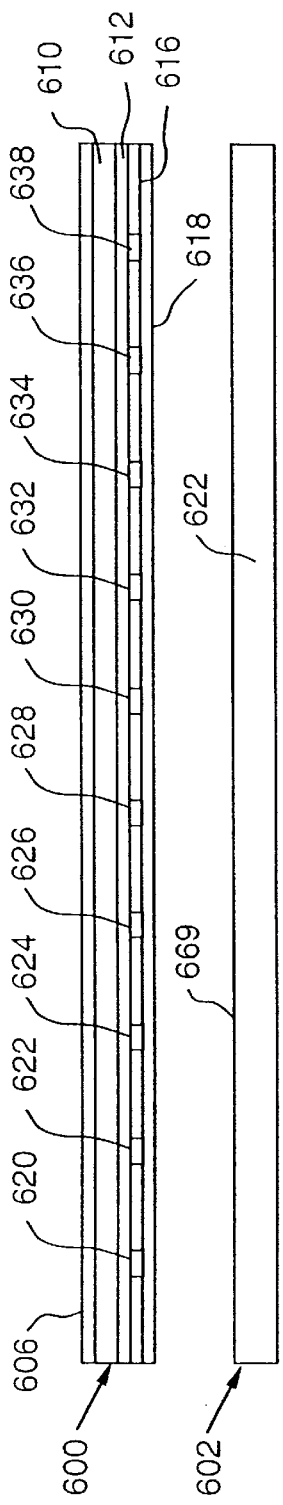
FIG. 12 is an exploded view of a modified embodiment of the present invention.

Referring to FIG. 12, a further embodiment of the present invention will be considered. In this embodiment, a lens 600, which has similar characteristics to that identified as 500 in FIG. 11, may be processed in a modified manner. The lens has a transparent and preferably substantially rigid resinous layer 610 with or without an overlying abrasive resistant film or coating 606 and an underlying integrally formed hologram 612. In a preferred embodiment, the hologram-containing layer 610 may be created by injection molding. It also has information 616 applied to the underside of hologram 612 and an underlying metallized layer 618 which may be selective in that one or more sections cover only part of the hologram in a predetermined manner or substantially continuous. In order to provide the "information," the metallized layer will be processed in a manner to be hereinafter described so as to create departures of a uniform metal coating, such as exemplified by areas 620, 622, 624, 626, 628, 630, 634, 636, 638 which represent areas not covered by the metallizing. Alternating with these regions are metallized regions 650, 652, 654, 656, 658, 662, 664, 666, 668 and 670. The integrally formed hologram 612, in the form shown, includes three rectangles 672, 673, and 674 which, as viewed from above, permit viewing of portions of the underlying alternating (a) nonmetallic regions 620–638 (even numbers only) and (b) metallized areas 650–664 (even numbers only). In the form shown, the information 616 also has fixed information consisting of "ABC CORP." It will be appreciated that, if desired, the information may be established through printing as by thermal transfer employing thermal transfer ribbons, wherein selected areas which are heated to cause the ribbon dye to create the information 616 or, in the alternative, or in addition thereto, the application of heat may cause the metallizing to be selectively altered in certain areas to provide the desired shape and reflectivity, thereby providing another degree of freedom.

Figure 13:
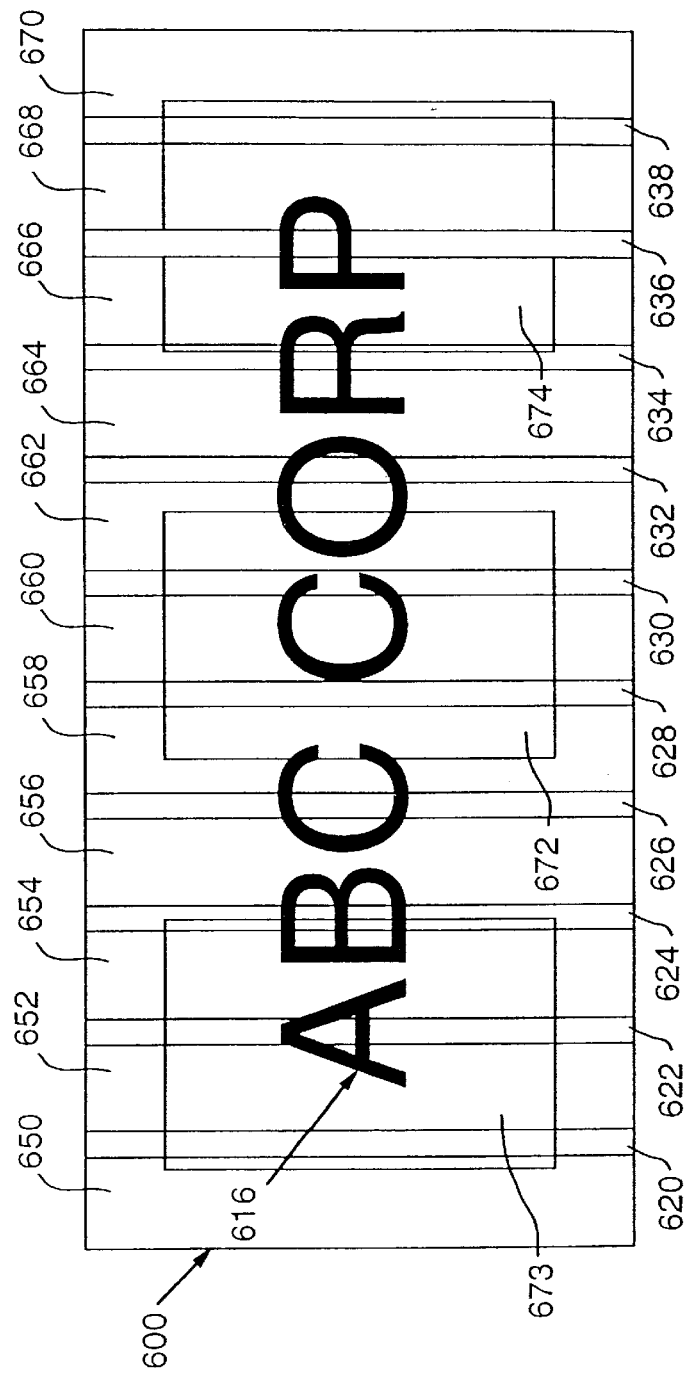
FIG. 13 is a top plan view of the lens of FIG. 12 with a predetermined pattern of voids provided in the metallized layer.

For purposes of illustration, it will be seen in FIG. 13 that the lens 600 has a selectively metallized layer 618 through which a plurality of voids or partial voids 620–638 in the form of generally parallel bands have been provided. The manner of providing these bands will be discussed hereinafter. An underlying, separately formed resinous base 602 is secured to the undersurface of metallized layer 618 as by the use of heat and pressure in order to seal the undersurface of the lens 600, thereby creating an informational article which resists tampering with the information 616 and metallized layer 618 and the voids created therein, such as elements 620–638. While the transparent upper layers 606, 610 permit viewing of the hologram 612 and the selectively metallized layer 618, it will be appreciated that access to the interior to alter the components will be resisted.

It will be appreciated that while a series of generally parallel bands 620–638 have been shown by way of example, the information 616 and/or metallized layer 618 can be in the form of words, letters, numbers, photograph images, graphic components, random voids, or any combinations thereof, in order to provide for a sealed, difficult to alter informational article. A preferred means of providing the lens 602 would be to create a metallized layer such as by, for example, spraying, vapor metallization, plasma circulation, or spattering a relative thin film of an appropriate metal, such as aluminum, copper or gold, for example, on the hologram 612. It is preferred that the metallized layer have a thickness of about 80 to 120 Angstroms have a contour corresponding to the hologram 612.

In a preferred manner of providing the voids 620–638 or selective application of a metallic layer to only predetermined portions of the hologram 612 involve a suitably programmed source of electrical energy to establish predetermined regions of heating of the metallized layer thereby melting the same to alter its appearance will be employed. A similar concept is employed in well known thermal transfer ribbon printers wherein the printer is programmed to selectively heat the ribbon in certain patterns and thereby transfer the dye to an article. Suitable printers are well known to those skilled in the art. See, for example, U.S. Pat. Nos. 5,947,618, 6,025,017 and 6,109,801, the disclosures of which are expressly incorporated herein by reference. Such ribbon thermal printing may be employed to create information 616 ("ABC CORP") on the hologram before metallizing. An alternative would be to print on the hologram by using an ink jet printer. As employed herein, the term "printed information" shall refer to information applied to the hologram before metallizing and information created after metallizing, but involving deposit of dye or other material as contrasted with the metallized portions or portions being altered purely by thermal means. In the present apparatus, a suitably programmed thermal printer may be employed without the thermally activated dye transfer ribbon and directly apply the pattern of heat to the metallized layer. This will generally involve positioning the metallized layer in contacting or relatively close proximity to the programmed thermal printer. The lens 600 may be provided with a generally continuous metallized layer or multiple separate metallized portions with someone located remote from the manufacturing location of the lens 600 applying the desired pattern. Subsequently, the underlying resinous base 602 has its upper surface 669 bonded to the lower surface of lens 600, thereby resisting subsequent access to the metallized layer without requiring at least partial destruction of the informational article. As the thermal printers and the method of programming the same are well known to those skilled in the art, details need not be provided herein.

It will be appreciated that a main objective in modifying the total or partial metallized layer will be to selectively apply heat in a pre-programmed manner so as to modify the metallized layer. In a first embodiment where printed information, such as information 616, which includes the letters "ABC CORP," is applied to the hologram 612 or in situations where information 616 is not employed, the continuous or selective presentation of metallized portions and subsequent pre-programmed thermal modification of the metal layer in desired areas produces the desired completed lens 600 which may subsequently be secured to the resinous base 602. It is desired to have the heat which selectively modifies the metallized layer be sufficiently intense as to also modify the resinous layer 610 within which the hologram 612 is formed to thereby permanently alter the hologram-containing resinous layer 610 and thereby further resist undesired alteration. It will be appreciated that the thermal modification of the metallized layer may be accomplished with a thermal printer or other means for programmed selected application of heat to the lower surface of the lens 600.

The base member 602 is preferably opaque so that the completed informational article may be viewed through the lens 600, but not through the base 602. If desired, the base 602 article may serve another purpose such as providing information, or in the case of certain informational articles, permitting insertion of certain customized information, such as an authorized individual signature, such as is shown, for example, in FIG. 6. If desired, a magnetic strip and associated components, as disclosed in connection with FIGS. 4–6, may be incorporated in base member 602. The magnetic strip may be loaded with desired data in a manner known to those skilled in the art after article formation is a final step in the process.

Figure 14:
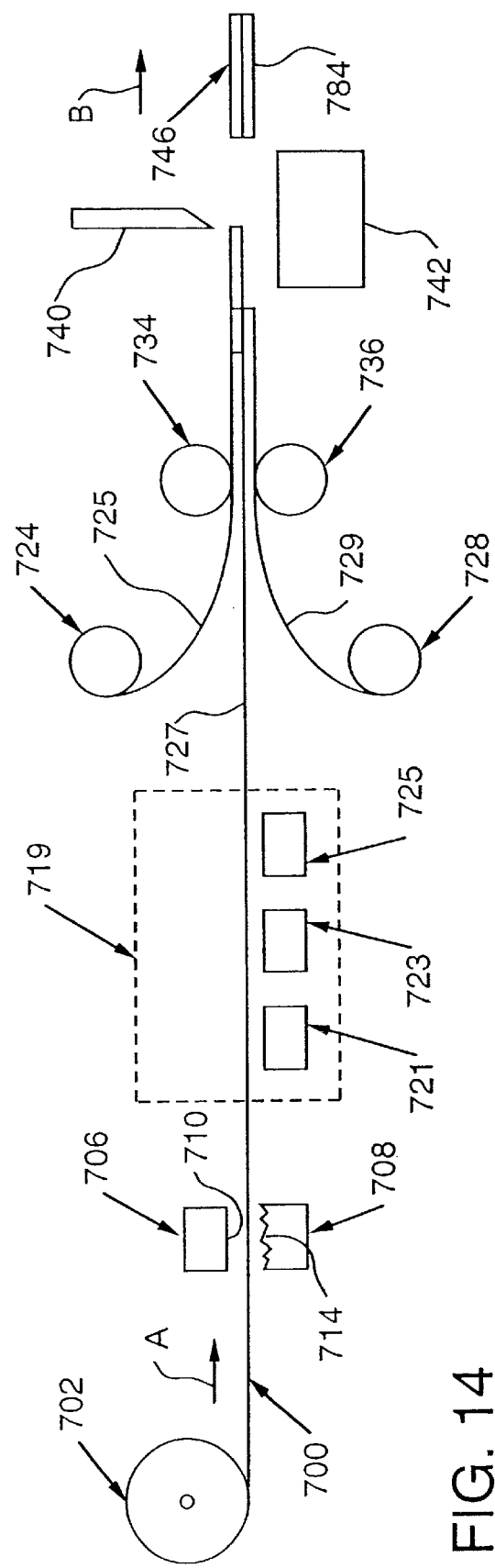
FIG. 14 is a schematic illustration of a form of method of manufacturing the modified construction of FIG. 12.

Referring to FIG. 14, a preferred method of this embodiment has a suitable source of the resinous plastic web material 700, such as reel 702, deliver the material in the direction shown by the arrow A to a station where a pair of co-acting members 706, 708 serve to form the hologram 612 (FIG. 12) in the lower surface of web 700. Co-acting element 706 has a generally planar (shown oversized for clarity of illustration) lower surface 710 and upper surface of co-acting element 708 has relief 714 which forms the hologram in the undersurface of web 700. In general, in a manner well known to those skilled in the art, the web 700 will dwell for a period of time required for the co-acting element 706, 708 to be subjected to relative closing movement in the manner with elevated temperature contributing to forming of the hologram. If the material out of which the lens is made is substantially rigid, it may be fed directly to the system without the use of reel 702.

In a preferred embodiment of the present invention, processing station 719 contains a suitable software controlled (a) printer 721, (b) metallizer 723, and (c) thermal unit 725 which customize the lens. The printer, which provides for information on the hologram, may be any suitable printer such as, for example, an ink jet printer or a programmable source of heat which may be applied to the lens in a predetermined manner, such as a thermal ribbon printer 719. The printer which provides information on the hologram may be any suitable printer such as, for example, an ink jet printer or a programmable source of heat which may be applied to the lens in a predetermined manner, such as a thermal ribbon printer 719. It will be appreciated that in one embodiment "printed information" will be applied to the hologram 612 followed by metallizing which may be a substantially continuous layer 618 or a plurality of metallized portions of predetermined configuration further followed by the application of heat to selected areas of the metallized portion to not only alter the metallized layer by creating voids therein, but also create corresponding indentations in portions of the resinous layer 610. If desired, the application of the printed information may be eliminated in an alternate embodiment. As shown in FIG. 14, the embodiment will have some information provided by printer 721 with metallizing being provided covering over the desired region or regions of the undersurface of the hologram 612 and portions of the information being provided through suitable metallizing unit 723. Subsequent selected heating of the metallized area being effected by programmed unit 725. It will be appreciated that unit 721 and 725 may be in direct contact with the resinous plastic material 700 or may be spaced sufficiently close thereto to accomplish the desired objectives. The lens 727 emerging from the thermal processor 719 proceeds in the direction of arrow A. The metallizing zone 723 applies a metallized layer preferably of a thickness of about 80 to 120 Angstroms.

A source of the anti-abrasive coating material 725 may be reel 724. This is secured in intimate relationship with hologram bearing portion of the web 727 under the influence of heated rolls 734, 736. Base material 729 stored on reel 728 is applied to the lower surface of lens 600 under the influence of heat and pressure through rolls 734, 736 followed by cutting to unit length by means of cutting element 740 and anvil base 742 in order to provide the customized informational article, such as 746, which are shown being transported on conveyor 784 in the direction indicated by arrow B. If required, suitable dwell time may be built into the system to facilitate effective fabrication at each stage.

A single process of manufacture of the entire article at a single location is shown in FIG. 14. If desired, the metallized hologram-containing lens may be made at a first manufacturing location with the printed information, such as shown in FIG. 13, such as 616, being provided at such location and variable information being provided at the same manufacturing location as a single point of manufacture method. In the alternative, a lens having a hologram formed therein may be delivered to a second manufacturing location which may be the end use environment wherein either a substantially continuous metal coating or selected coated regions are created and the thermally created modifications to the metallized coating will be established with subsequent joinder of the lens 600 and base 602 serving to complete the article. In such case, the standard or fixed information may be provided at either the place of lens manufacture or, more preferably, at the end user location with the customized or variable information also being applied at the end user location. As employed herein the reference to two manufacturing locations refers to two distinct separate manufacturing facilities as distinguished from two locations within a single manufacturing facility. The second manufacturing facility may be the end user location, for example.

Figure 15:
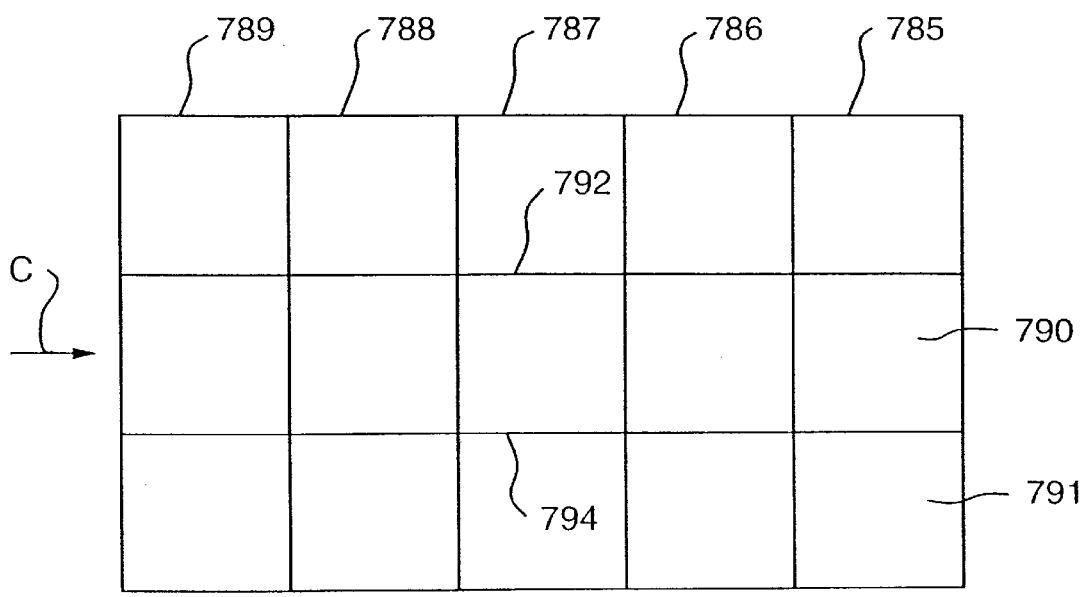
FIG. 15 is a plan view showing a multiple width, multiple length informational article prior to separation of individual articles therefrom.

While it is presently preferred to create one article at a time, referring to FIG. 15, there is shown an alternate embodiment having a multiple unit master of informational articles with the direction of arrow C generally corresponding to the direction of arrows A and B in FIG. 14. In the form shown, the unit has been made in multiple lengths, which consists of a first line having units 785, 786, 787, 788, 789, and corresponding adjacent units having as the first unit 790 and 791, respectively. A cutter of the type of cutter 740 may be employed to sever these units transversely by providing a suitable size to the cutter 740 and anvil 742 of FIG. 14. Similarly, it is noted that the form shown in FIG. 15 is made in multiple widths. In this case, the units are three wide as exemplified by 785, 790, 791. Appropriate longitudinal cutting along separating lines 792, 794 will separate the multiple widths. In this manner, if desired, the efficiency of multiple width and multiple length manufacture as a unit followed by subsequent separation into individual units may be employed. In general, the lens portions would be secured to the base portions after the hologram has been provided and prior to separation. If desired, however, the customized processing through applying printed information underlying the hologram and modification of the metallized layer may be accomplished subsequent to separation and prior to securement of the base thereto.

Figure 16:
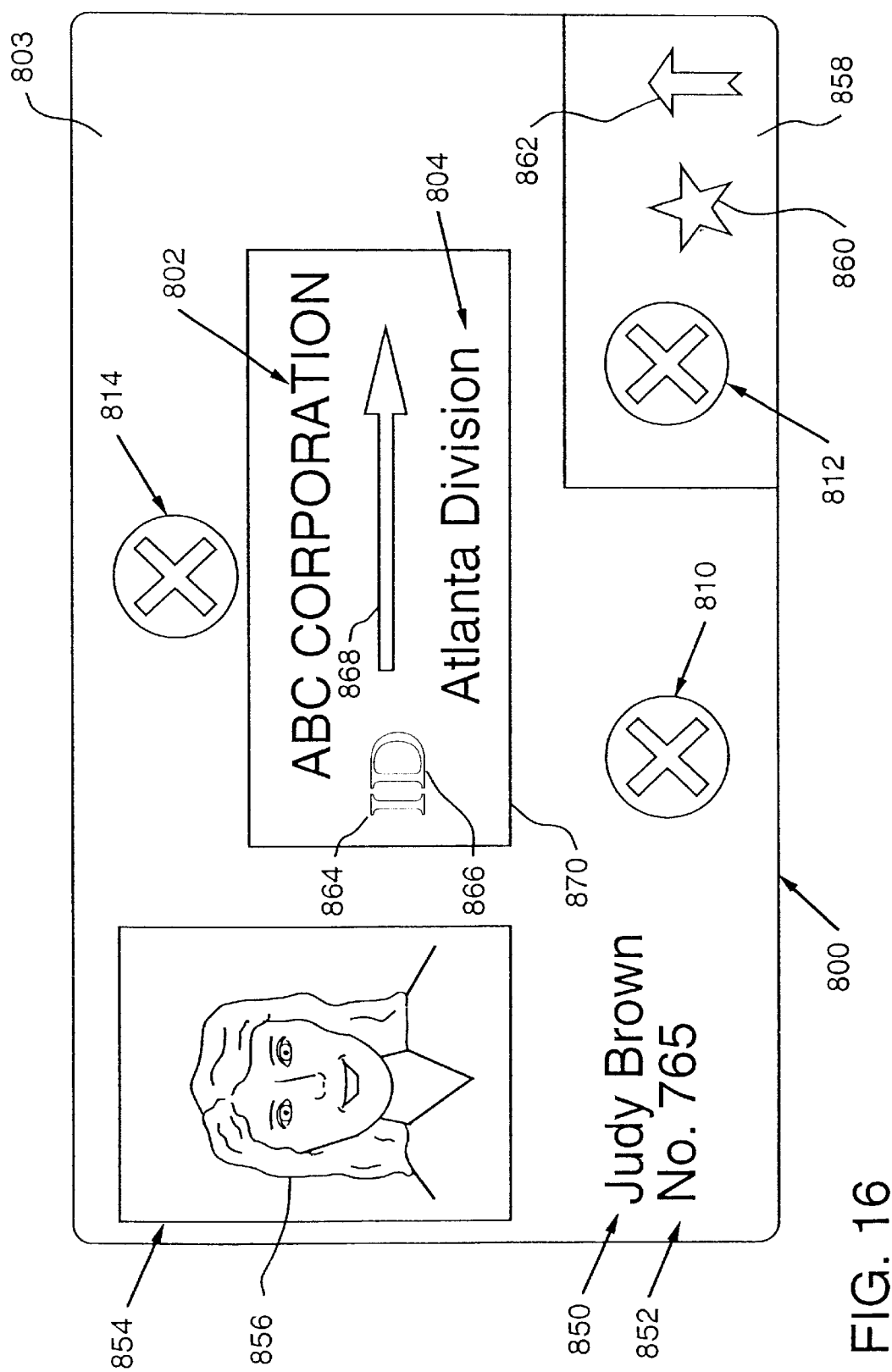
FIG. 16 shows a modified form of the informational article of the present invention wherein both fixed information and customized or variable information have been provided.

Referring to FIG. 16, there is shown an informational article 800 which has a transparent upper anti-abrasive layer 803. The combined lens and base may be of the type illustrated in FIG. 12. In this version, the transparent resinous plastic layer has a hologram formed on the underside thereof. In this form of the invention, a thermal printer may be employed with a thermally activated thermal transfer ribbon to apply information 802 ("ABC Corporation") and 804 ("Atlanta Division") to the undersurface of the hologram. The hologram in the form shown may consist of a plurality of graphic elements such as those indicated by the numbers 810, 812, 814 with any desired number being present. The information 802, 804 may be regarded as being fixed or standard information. Similarly, the thermal transfer ribbon may create variable information, such as the name "Judy Brown" identified by the number 850 and employee number "No. 765" identified by the number 852. The selectively metallized portions may include a rectangle 854 within which a photographic representation 856 of the individual has been provided through selective heating of the metallized layer defining rectangle 854 to cause voids in the rectangle 854 and a degree of penetration into the resin film so as to resist alteration of the same. Similarly, a rectangle 858 containing graphic components 860 and 862 formed by selective thermal activation within the metallized rectangle 858 and the metallized letters ID 864, 866, and arrow 868 all formed within elongated metallized rectangle 870 which is metallized and customized through selective electrically generated heating is provided. It will be appreciated that in this manner, the informational article can be created in two stages with initial lens formation and, if desired, certain first information provided as by printing followed by metallizing and modification within the metallized zone or zones to create additional or second information which may be variable information with the lens subsequently being secured to an underlying base which is preferably opaque to thereby complete the article. This provides resistance to direct access to the information coupled with resistance to alteration in view of the metallized regions having thermally altered adjacent resinous areas of corresponding information and the holograms serving to resist photocopying of the article.

In the present embodiment, a uniform metallized coating which may be substantially continuous and coextensive with the article or may, as shown in FIG. 16, be located in selected areas, is subjected to the action of the electrically energized software controlled thermal output printer or similar device to create both standard information and variable information. In general, it will be preferred to provide the standard or fixed information on the underside of the lens first and then subject that article to metallizing and creation of the variable information. The underlying base member would then be secured to the same to seal the article and resist direct access to the hologram and metallized layer. Selective thermal alteration of portions of the metallized layer may provide the fixed information prior to or simultaneously with the variable information. In the example shown in FIG. 16, the variable information includes the employee's name 850, her employee identification number 852, and her likeness 854. As with all of the fixed information and variable information employed in the informational article, the information may be stored in the software particularly for the fixed information or may be scanned into a microprocessor, such as the variable information 850, 852, 856.

It will be appreciated that this embodiment of the invention facilitates many of the advantageous security features of the present invention while enhancing the ability of the end user to finalize the article while not being required to invest substantial sums in equipment. Also, the systems may be set up so as to be readily employable by the end user without requiring highly skilled operators. If desired, other features of the invention which serve to resist undesired photocopying of the informational article, such as, for example, providing color variations, particles such as 226, 228 (FIG. 4) or particles, such as 400, 402 (FIG. 7), may be employed in the lens portion overlying the metallic layer. It will be appreciated that the concept of this embodiment of the invention may be employed on a wide variety of informational articles including application to products, such as CDs, three-dimensional products, parts for various products, and various types of warranty information applied to the products, or cards.

Referring to FIG. 17, a further embodiment of the present invention will be considered. In this embodiment a base layer 950 which may be composed of a suitable resinous material, such as polycarbonate or polyester, for example, forms the base for a tamper-resistant informational article which may be a card. The base has a lower surface 951 and an upper surface 953 within which a hologram 952 or a plurality of holograms are integrally formed. Overlying the hologram, in the form shown in this figure, is an informational layer 954 which may contain fixed information or variable information or both. Overlying the informational layer 954 are a plurality of partially metallized regions 960, 962, 964 which will serve to visualize portions of the underlying hologram 952 and underlying information contained in informational layer 954. Shown in exploded view is an overlying transparent lens 970 which will be secured to the base 950 as by influence of heat or adhesive as desired. The sealed assembly, therefore, provides customized informational articles which as a result of the presence of the holograms resist undesired photocopying, and as a result of the partial metallized portions 960, 962, 964 and the information underlying informational layer resists undesired counterfeiting with the assembly resisting access to the hologram 952, the informational layer 954 and the partially metallized portions 960, 962, 964. If desired, partially metallized portions which are sufficiently thick as to resist reading an underlying hologram or other information may be employed in addition to or in lieu of the metallized sections which permit viewing therethrough. If desired, different metals may be employed for different properties, such as aesthetics and efficient color contrast as well as creating desired resistance to reproduction. Further, different metals have different electrical conductivities.

FIG. 18 shows an embodiment generally similar to FIG. 17 with the opaque base 950 having a hologram 952 formed in the upper surface 953 thereof with a plurality of partially metallized regions 976, 978, 980 contained within metallized layer 974. The term "partially metallized" as used in connection with the embodiments of FIG. 17 through 20 means that one or more metallized portions are presented in the product, but that less than all of the product is covered. The term "partial" therefore refers to the extent of coverage and is not directly related to the alternate refinement regarding the extent to which a viewer may see through the partially metallized layer to visualize the underlying hologram or information. This is a separate concept. In this embodiment, the informational layer 954 overlies the partially metallized zones 976, 978, 980. In both the embodiments of FIGS. 17 and 18, the information may be provided in partially underlying or overlying relationship with respect to the partially metallized regions or be entirely independent thereof. Further, if desired, a combination of the embodiments of FIGS. 17 and 18 may be provided with information both underlying and overlying the partially metallized layer such as 974.

Figure 19:
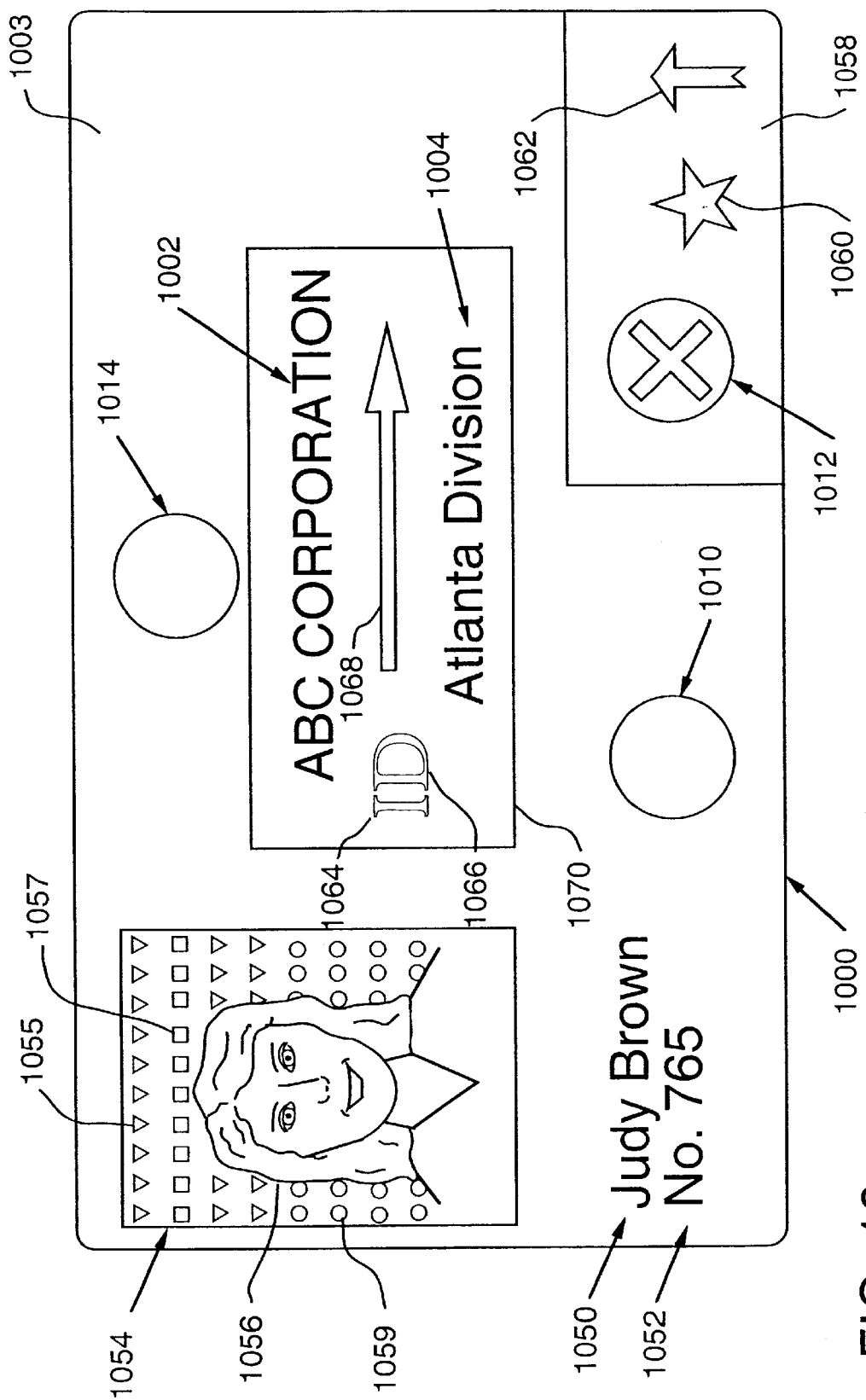
FIG. 19 is a top plan view of an item representative of the embodiments of FIGS. 17 and 18.

Referring to FIG. 19, there is shown an identification card generally similar to that of FIG. 16, but showing features of this embodiment of the invention.

As shown in FIG. 19, a tamper-resistant informational article 1000 has a transparent upper anti-abrasive layer 1003. The assembly may be generally the same as the embodiments discussed in connection with FIGS. 17 and 18. As shown toward the center of FIG. 19, fixed information such as "ABC CORPORATION" 1002 and "Atlanta Division" 1004 may be provided over the hologram, either under or over the partially metallized generally horizontal rectangle 1070. For purposes of example, it will be assumed that the metallized layer 1070 has the fixed information 1002, 1004 underlying the layer and that additional fixed information, such as the letters "I" 1064 and "D" 1066, as well as the arrow 1068, overly the metallized region 1070. This combination makes it difficult to tamper with or photo reproduce the informational article 1000. It is noted that two partially metallized regions 1010 and 1014 take the form of circles which do not permit viewing therethrough, but rather appear as metallic circles.

Similarly, referring still to FIG. 19, partially metallized region 1058 permits viewing therethrough of underlying hologram segments 1012, 1058, 1060.

Customized information in the nature of the name "Judy Brown" 1050 and "No. 765" 1052 may be provided in any desired manner as by printing and is not associated with a partially metallized portion.

Photograph 1056 of the individual has been superimposed on a metallized region 1054 which metallized region serves to visualize a plurality of hologram elements such as triangle 1055, squares 1057 and circles 1059. Efforts to photocopy this portion of the informational article 1000 would be unsuccessful.

Figure 20:
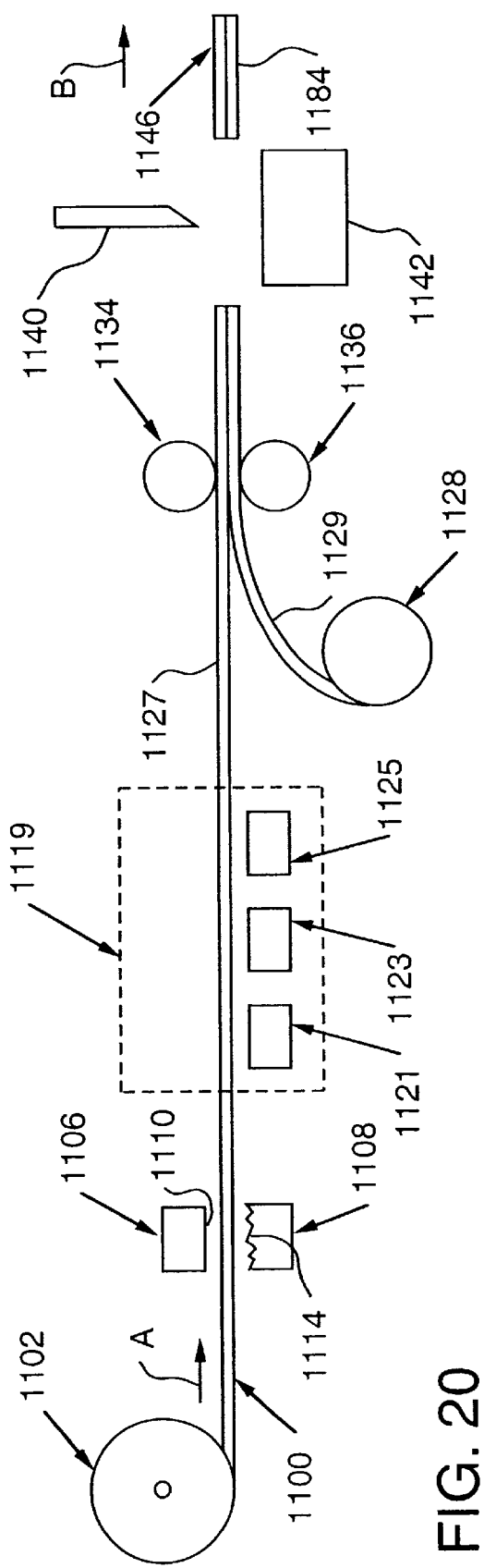
FIG. 20 is a schematic illustration of the form of method of manufacturing the modified embodiments of FIGS. 17 through 19.

Referring to FIG. 20, a method of manufacturing the informational article of FIGS. 17 through 19 will be considered. A suitable source of a resinous plastic web material to serve as the base 950 may if the base is sufficiently thick to be rigid be supplied in sheet-like form which is severed into individual elements. Alternatively, as shown in FIG. 20, if the base is sufficiently thin as to be flexible, a supply of the material 1100 may be provided on reel 1102 and move in the direction indicated by arrow A to a first station where a pair of co-acting members 1106, 1108 have respective faces 1110, 1114 disposed on opposite sides of the web 1100 to form a hologram such as 952 in FIGS. 17 and 18 on the undersurface of the web. Surface 1110 will generally be planar and irregular hologram forming surface 1114 has been exaggerated for purposes if illustration. The web 1100 will dwell between the closed co-acting members 1106, 1108 for the desired period of time after which it is opened and moves to processing station 1119.

In processing station 1119 are a first printer 1121 for use when it is desired to print on predetermined portions of the hologram prior to application of partial metallizing by metallizer 1123. If it is desired to print over the partially metallized portions in predetermined regions, printer 1125 may be employed. The base web material 1100 emerges with the hologram and either no printing or printing underlying the metallized portions or printing overlying the metallized portions or both emerges as web 1127. The printers 1121, 1125 may be suitably programmed thermal transfer printers, jet printers or any other suitable source. A source of the lens material 1129, such as reel 1128, feeds the lens material between rolls 1134, 1136 which under the influence of pressure and heat serves to intimately bond the assembly together. Further movement in the direction shown generally by arrow B results in the cutting element 1140 which cooperates with anvil 1142 severing individual informational articles as shown as 1146 with the undersurface of the base indicated as 1184.

It will be appreciated, therefore, that the present invention provides means for establishing an effective, economical, secure, tamper-resistant and photocopy resisting informational article and the resultant article. All of this is accomplished while facilitating advantageous use of holograms, transparent resinous plastic materials, photocopy resisting particles and providing fixed information and variable information in a secure manner which information is readily visible to the naked eye and/or machine readable. This system contemplates embodiments wherein magnetic storage media and antennas may be employed. Also, bar codes and other identifying means may be used.

Whereas particle embodiments of the present invention have been described herein for purposes of illustration, it will be appreciated by those skilled in the art that numerous variations of the details may be made without departing from the invention, as described in the appended claims.

What is claimed is:

1. A method of creating a tamper-resistant informational article comprising
   providing an opaque resinous base member having a lower surface and an upper surface,
   creating a hologram in the upper surface of said base member,
   partially metallizing said upper surface, and
   permanently securing a transparent lens overlying said base member upper surface.

2. The method of creating a tamper-resistant informational article of claim 1 including
   creating a plurality of partially metallized portions within said partially metallized layer.

3. The method of creating a tamper-resistant informational article of claim 2 including
   creating information at least partially overlying said partially metallized portions.

4. The method of creating a tamper-resistant informational article of claim 2 including
   providing information at least partially underlying said partially metallized portions.

5. The method of creating a tamper-resistant informational article of claim 2 including
   providing at least some of said partially metallized portions with portions of said hologram visible therethrough.

6. The method of creating a tamper-resistant informational article of claim 4 including
   providing said underlying information such that it will be visible through said partially metallized portions.

7. The method of creating a tamper-resistant informational article of claim 1 including
   creating said informational article as a card.

8. The method of creating a tamper-resistant informational article of claim 1 including
   creating information between said opaque base member upper surface and said transparent lens.

9. The method of creating a tamper-resistant informational article of claim 8 including
   creating said information with both fixed information and variable information.

10. The method of creating a tamper-resistant informational article of claim 3 including
    creating said information at least partially underlying said partially metallized portions.

11. The method of creating a tamper-resistant informational article of claim 1 including
    providing a photograph within and overlying a said partially metallized zone which in turn overlies a hologram.

12. The method of creating a tamper-resistant informational article of claim 4 including
    creating said partially metallized portions such that underlying holograms or information can be viewed therethrough.

13. The method of creating a tamper-resistant informational article of claim 3 including
    providing said information by printing.

* * * * *